United States Patent [19]

Ruben

[11] Patent Number: 4,613,552
[45] Date of Patent: Sep. 23, 1986

[54] CELL CATHODE MATERIAL

[76] Inventor: Samuel Ruben, 52 Seacord Rd., New Rochelle, N.Y.

[21] Appl. No.: 671,147

[22] Filed: Nov. 13, 1984

Related U.S. Application Data

[63] Continuation-in-part of Ser. No. 390,387, Jun. 21, 1982, Pat. No. 4,487,822.

[51] Int. Cl.$^4$ .......................... H01M 4/50; B05D 5/12
[52] U.S. Cl. .................................... 429/224; 29/623.1; 29/623.5; 427/126.1; 427/215
[58] Field of Search ............................. 29/623.1, 623.5; 429/224; 422/126.1, 215

[56] References Cited

U.S. PATENT DOCUMENTS

| | | | |
|---|---|---|---|
| 2,463,316 | 3/1949 | Ruben | 429/224 X |
| 2,536,696 | 1/1951 | Ruben | 429/224 X |
| 3,620,848 | 11/1971 | Epstein et al. | 429/224 X |
| 4,487,822 | 12/1984 | Ruben | 429/199 |

FOREIGN PATENT DOCUMENTS 59-7466  1/1984  Japan.

OTHER PUBLICATIONS

Derwent Abstract 82-06530.

*Primary Examiner*—Brian E. Hearn
*Assistant Examiner*—Stephen J. Kalafut
*Attorney, Agent, or Firm*—Ronald S. Cornell

[57] ABSTRACT

The invention is a conductive composite crystal of a permanganate and a conductive material such as graphite or other carbonaceous material for use as a cathodic material in a galvanic cell. The invention also includes methods for producing the conductive composite crystal comprising impregnating a carbonaceous substrate with a super-saturated permanganate solution or mixing or suspending graphite in a saturated hot solution of permanganate, stirring the solution and evaporating the water of the solution.

24 Claims, No Drawings

CELL CATHODE MATERIAL

This is a continuation-in-part of U.S. patent application Ser. No. 390,387 filed June 21, 1982, now U.S Pat. No. 4,487,822.

This invention relates to cathodic materials, particularly permanganates, for galvanic cells.

Permanganates, particularly potassium permanganate have been utilized as cathodic reactants in galvanic cells.

In a number of my U.S. patents, including U.S. Pat. No, 2,463,316 issued Mar. 1, 1949, I describe a cell comprising a cathodic reactant of potassium permanganate, a zinc anode and a zincated potassium hydroxide electrolyte.

In my U.S. Pat. No. 4,306,005, issued Dec. 15, 1981, I describe a cell employing a saturated lithium hydroxide electrolyte having a zincated content, a potassium permanganate-graphite reactant and an amalgamated zinc anode.

In other of my U.S. Patents including U.S. Pat. Nos. 2,422,045; and 2,669,597 galvanic cells are described using alkaline metal permanganates and zinc anodes and silver permanganates with tin anodes.

In my co-pending U.S. patent application Ser. No. 293,102 filed Aug. 17, 1981, I describe a potassium permanganate cell having an alkaline phosphate electrolyte such as sodium tri-orthophosphate.

The present invention is a conductive composite crystal of a permanganate for use as a cathode in the cells such as described in the aforementioned patents. Cells having such conductive composite crystals in the cathodes thereof exhibit improvement in cell capability. The present invention further embodies methods for making such conductive composite crystals.

In prior art cells when permanganates such as potassium permanganate were used as the cathodic reactants in cells, they were generally mechanically mixed with a conductor such as micronized graphite (in the range of 5–15% and usually about 10% by weight) so as to make conductive cathodes which were then pressed into discs, cylinders or other shapes, dependent upon the desired cell structure. Extreme care was necessary in blending the mixture since a highly oxidizing material, the permanganate, was ground with an organic material such as graphite.

I have discovered that maximum conductivity between the permanganate and conductive materials such as graphite may be obtained by forming integrally mixed crystals of the permanganate and graphite. Such integrally mixed crystals, in addition to providing enhanced conductivity, are safer to handle since the composite crystal (with the permanganate and graphite already having been integrated) is readily granulated to the desired size for pelleting or forming a cylinder.

The composite crystal is preferably formed by preparing a mixture or suspension of graphite, preferably submicronized pyrolytic graphite (or other conductive powder material such as microfine silver) in a saturated hot solution of the permanganate. The permanganate is dissolved in water at 100° C. to saturation, 10% or 15% of the permanganate weight of micronized graphite is added and the mixture continuously agitated such as by stirring or vibrating at 100° C. and exposed to the atmosphere over a wide surface until evaporation of the water occurs and integrally mixed crystals of permanganate and graphite are produced. Continuous mixing by stirring or vibration is essential for maintenance of a 90–10 graphite mix to avoid separation during cooling. This method assures maximum contact between the ionic and the electronic conductors.

The amount of the conductor is determined by the desired rate capability. However, it is generally preferred that, in the above described mixture or suspensions, the conductive material (such as graphite) be present in amounts of between 5 to 25% by weight of the permanganate and more preferably about 10% to 25% by weight of the permanganate. Lesser amounts provide lower conductivity and greater amounts reduce the capacity of the cathode. However, even in such lesser or greater amounts, relative conductivity in the cathode and cell performance is enhanced and accordingly such differing amounts fall within the ambit of the present invention.

For cells of cylindrical construction, such integral reactant can also be produced by impregnating a porous conductive vitreous carbon or reticular graphite cylinder with an aqueous supersaturated solution of the desired permanganate and heating to 100° C. or higher until the water content has been evaporated, the permanganate crystals being deposited within the pores or interstices of the cylinder. The preferred oxidation resistant cylinder is one made of pyrolytic graphite, produced by reacting reticulated vitreous carbon with a hydrocarbon gas, such as methane or acetylene at a temperature of 2000° C., to deposit dense highly electrically conductive pyrolytic graphite on the reticulated vitreous carbon.

With the formation of the conductive composite crystal of graphite and permanganate, the permanganate component becomes conductive, when hydrated by the electrolyte, since it is integrally bonded to the micronized graphite or carbonaceous substrate in the process of crytallization from the permanganate solution. The conductivity and coulombic capacity of the permanganate mixture is increased and the cell is able to sustain a higher load potential. Of considerable importance, the thermal stability of the conductive crystal such as of potassium permanganate is greatly enhanced over the pure permanganate crytal. For example, with potassium permanganate, there is an increase from 240° C. to 308° C. in thermal stability despite the normal lowering of thermal stability when an impurity is introduced into a crystal of permanganate.

The permanaganate solutions for producing the integrally bonded crystals may be of potassium, sodium, lithium, barium, caesium and silver. They all have different solubilities in water with caesium being the lowest.

The solubilities of potassium, barium and calcium permanganates in 100 ml of water at 25° C. are: potassium permanganate 25 grams; barium permanganate 75.4 grams, and calcium permanganate 338 grams. At 90° C. the solubilities are higher. Other permanganates include sodium and silver permanganate with the former being highly soluble in water and the latter having a low solubility but nevertheless sufficient for operation of the present invention.

I have also found that aqueous solutions of tin fluoborate $(SnBF_4)_2$ in concentrations such as 20% to 50% have the unexpected property of not dissolving most of the solid permanganates of the alkali or alkaline earth metals, for example the permanganates of potassium, sodium, barium and calcium, and that this characteristic allows the efficient use of the permanganates (as integrated with a carbonaceous material in accordance with the present invention) in galvanic cells with long shelf life and minimal reduction of capacity.

I have also found that Ba(MnO$_4$)$_2$ is only slightly soluble in a 48% solution of tetrafluoboric acid (HBF$_4$) and has a higher voltage and current capacity. This electrolyte also permits the use of a cadmium anode whereas cadmium can not be used with the tin fluoborate electrolyte. It is preferred that some cadmium fluoborate be added to the cell to enhance cadmium anode utilization. Three cells made with HBF$_4$ electrolyte and Ba(MnO$_4$)$_2$ plus 15% graphite, show the following:

Ba(MnO$_4$)$_2$/48% HBF$_4$/Cd—2.03 volts
Ba(MnO$_4$)$_2$/48% HBF$_4$/Pb—1.79 volts
Ba(MnO$_4$)$_2$/48% HBF$_4$/30% Sn—70% Pb—1.73 volts I have found that in the fluoborate cell systems, the potential is mostly developed between the permanganate and the tin fluoborate electrolyte, the anode contributing a lesser part. This differs from other galvanic systems where the potential is mostly developed at the anode, according to its oxidation potential. This allows a wide choice of anode materials, the preferred ones being tin and lead-tin alloys, such as 70% lead—30% tin or lead, the potential range in such cells being in the order of 1.73 to 2.03 volts. Such materials are preferred because of enhanced compatability with the fluoborate electrolyte. However, in alkaline systems, other anode materials such as zinc or cadmium are utilizable. For example, a cell with a powdered zinc anode, a zincate sodium hydroxide electrolyte and a composite potassium permanganate (10% integrated graphite) cathode provides a useful potential of 1.78 volts.

In utilizing the permanganate cathode made in accordance with this invention various cell structures known to the art may be employed, such as the types shown in my U.S. Pat. Nos. 2,422,045, for example FIG. 15, and 2,463,316, FIG. 4. Cells may be made with all liquid electrolyte or electrolyte absorbed in spacer material such as point bonded Pellon (non-woven poly-propylene) and with a barrier such as a composite of grafted stable polymer such as Permion, to prevent migration of the micronized graphite.

The electrolyte may also be of the type described in the aforementioned U.S. Pat. No. 4,306,005 in which a solid alkaline material can be added to the depolarizer to provide a more porous structure such as with the addition of solid lithium hydroxide or sodium phosphate to the composite permanganate cathode. Other hydrolyzable solids such as barium hydroxide and sodium triphosphate crystals in the order of 10 to 15% may be used to advantage.

The tin fluoborate may be made by reacting boric acid with a solution of hydrofluoric acid to form fluoboric acid (HBF$_4$)$_2$ then adding hydrated tin oxide until the reaction to tin fluoborate Sn(BF$_4$)$_2$ occurs in solution. The concentration of tin fluoborate in the aqueous solution may be from 25% to 50%. If desired, the tin fluoborate electrolyte may be immobilized by the addition of suitable gelling agents, such as the polyvinyl alcohols or carboxy methyl cellulose.

Tetrafluoboric acid (48% HBF$_4$) is the preferred electrolyte because of the favorable characteristic of reduced permanganate solubility therein. Other electrolytes for alkaline cells such as those described in the prior art patents including potassium and lithium hydroxide, alkaline phospate electrolytes such as sodium tri-orthophosphate and other tin salts such as tin fluosilicate (with tin or lead anodes) are however useful in cells having the integrated permanganate-carbonaceous material cathodes of the present invention.

It is understood that the above description of materials, ratios and cell components and structures are illustrative in nature and that changes may be made without departing from the scope of the present invention as defined in the following claims.

What is claimed is:

1. A method for forming composite integrally mixed crystals of a permanganate and a powdered conductive material, said method comprising comprising a mixture or suspension of said conductive material in a saturated hot aqueous solution of said permanganate, and agitating said mixture or suspension while evaporating the water, whereupon said composite integrally mixed crystals are produced.

2. A method for forming composite integrally mixed crystals of a permanganate and powdered graphite, comprising preparing a mixture or suspension of said graphite in a saturated hot aqueous solution of said permangante, and stirring said mixture or suspension while evaporating a portion of the water, whereupon said composite integrally mixed crystals are produced.

3. The method of claim 2 wherein said permanganate is selected from the group consisting of potassium, sodium, barium, silver and calcium permanganate.

4. The method of claim 3 wherein said permanganate is potassium permanganate.

5. The method of claim 4 wherein said graphite is micronized.

6. The method of claim 4 wherein said graphite is between 5 to 15% by weight of said potassium permanganate.

7. A method for forming a cell comprising impregnating a porous carbonaceous material with an aqueous super-saturated solution of a permanganate and heating to at least 100° C. to evaporate the water whereupon permanganate crystals are deposited within the pores thereof, and utilizing the resulting permanganate crystal-carbonaceous material as cathodic reactant in a cell with an electrolyte and an anode.

8. A cell having a cathode comprised of integrally mixed permanganate and graphite comprising permanganate crystals having graphite nucleii, with said crystals being made by preparing a mixture of suspension of powdered graphite in a saturated hot aqueous solution of said permanganate, and agitating said mixture or suspension while evaporating the water, whereupon said integrally mixed crystals are produced.

9. The cell of claim 8 wherein said permanganate is potassium permanganate.

10. A cell made in accordance with the method of claim 7.

11. The cell of claim 10 wherein said electrolyte is comprised of tetrafluoboric acid.

12. The cell of claim 10 wherein said permanganate is barium permanganate.

13. The cell of claim 12 wherein said anode is comprised of cadmium and said electrolyte is comprised of tetrafluoboric acid.

14. The cell of claim 13 wherein said cell further contains cadmium fluoborate.

15. The cell of claim 10 wherein said cell contains an electrolyte comprised of tin fluoborate.

16. An electric current producing cell comprising an anode, an electrolyte and a cathodic reactant comprised of composite integrally formed crystals of permanganate and a conductive material, wherein said conductive material comprises the nucleii of crystals of said permanganate.

17. The cell of claim 16 wherein said conductive material is graphite.

18. The cell of claim 17 wherein said graphite is micronized.

19. The cell of claim 16 wherein said graphite comprises between 5 to 15% by weight of said permanganate.

20. The cell of claim 16 wherein said electrolyte is comprised of tetrafluoboric acid.

21. The cell of claim 16 wherein said permanganate is barium permanganate.

22. The cell of claim 21 wherein said anode is comprised of cadmium and said electrolyte is comprised of tetrafluoboric acid.

23. The cell of claim 22 wherein said cell further contains cadmium fluoborate.

24. The cell of claim 8 wherein said cell contains an electrolyte comprised of tin fluoborate.

* * * * *